US008770328B2

(12) United States Patent
Hilberer

(10) Patent No.: US 8,770,328 B2
(45) Date of Patent: Jul. 8, 2014

(54) PROCESS FOR CONTROLLING A START-STOP OPERATION OF A VEHICLE HAVING A HYBRID DRIVE, AND A CORRESPONDING VEHICLE

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/615,978

(22) Filed: Sep. 14, 2012

(65) Prior Publication Data

US 2013/0025951 A1 Jan. 31, 2013

Related U.S. Application Data

(62) Division of application No. 12/683,749, filed on Jan. 7, 2010, now Pat. No. 8,322,473.

(30) Foreign Application Priority Data

Jan. 8, 2009 (DE) .......................... 10 2009 004 023

(51) Int. Cl.
*B60W 10/00* (2006.01)
*B60W 20/00* (2006.01)
*B60W 10/30* (2006.01)
*B60K 17/356* (2006.01)
*G06F 7/70* (2006.01)

(52) U.S. Cl.
USPC ............. 180/65.265; 180/65.27; 180/65.275; 180/244; 701/70

(58) Field of Classification Search
USPC ......... 180/65.265, 65.21, 65.27, 65.275, 244; 701/22, 29, 70; 188/156, 158, 159; 303/3, 15, 16, 152
See application file for complete search history.

(56) References Cited

U.S. PATENT DOCUMENTS 4,400,039 A * 8/1983 Ogata ............................... 303/3
4,533,011 A   8/1985 Heidemeyer et al.
(Continued)

FOREIGN PATENT DOCUMENTS

DE   29 43 554 C2   5/1981
DE   195 32 135 A1   3/1997
(Continued)

OTHER PUBLICATIONS

German Office Action dated Jul. 30, 2009 with English translation (thirteen (13) pages).

*Primary Examiner* — J. Allen Shriver, II
*Assistant Examiner* — James M Dolak
(74) *Attorney, Agent, or Firm* — Crowell & Moring LLP

(57) ABSTRACT

A process for controlling a vehicle start-stop operation having a hybrid drive with an internal-combustion engine and an electric motor, a service brake with an ABS and an electric parking brake, includes: determining, monitoring and analyzing performance parameters of the vehicle, the internal-combustion engine, the electric motor, the service brake and the parking brake; automatically releasing the parking brake in the case of a starting prompt because of determined performance parameters; driving the vehicle by the electric motor for the start; starting the engine by the electric motor if the engine is switched off; driving the vehicle by the electric motor and the engine; activating a generator operation of the electric motor in the case of a braking prompt because of determined performance parameters; activating the service brake; and automatically locking the electric parking brake when the vehicle is stopped after a previously definable deceleration time.

6 Claims, 3 Drawing Sheets

(56) References Cited

U.S. PATENT DOCUMENTS

| | | | |
|---|---|---|---|
| 4,717,207 A * | 1/1988 | Kubota et al. | 180/290 |
| 5,139,315 A * | 8/1992 | Walenty et al. | 303/162 |
| 5,667,282 A * | 9/1997 | Kim | 303/3 |
| 5,934,395 A * | 8/1999 | Koide et al. | 180/65.235 |
| 6,076,899 A | 6/2000 | Isella | |
| 6,202,776 B1 | 3/2001 | Masberg et al. | |
| 6,290,309 B1 * | 9/2001 | Korn | 303/122.05 |
| 6,308,129 B1 | 10/2001 | Uchida | |
| 6,358,180 B1 * | 3/2002 | Kuroda et al. | 477/4 |
| 6,447,074 B2 | 9/2002 | Engelhard | |
| 6,540,035 B2 | 4/2003 | Nagano et al. | |
| 6,631,796 B2 * | 10/2003 | Yanaka et al. | 192/219.4 |
| 6,758,788 B2 | 7/2004 | Itou | |
| 6,830,118 B2 | 12/2004 | Koelle et al. | |
| 7,037,234 B2 | 5/2006 | Kahlon et al. | |
| 7,121,633 B2 * | 10/2006 | Tachiiri et al. | 303/20 |
| 7,238,133 B2 * | 7/2007 | Tabata et al. | 475/5 |
| 7,311,163 B2 | 12/2007 | Oliver | |
| 7,325,887 B2 * | 2/2008 | McCann et al. | 303/155 |
| 7,417,531 B2 * | 8/2008 | Obradovich | 340/426.33 |
| 7,628,459 B2 * | 12/2009 | Herges | 303/20 |
| 7,644,996 B2 * | 1/2010 | Bredin | 303/89 |
| 7,823,668 B2 * | 11/2010 | Ogata et al. | 180/65.265 |
| 8,041,475 B2 | 10/2011 | Fujita et al. | |
| 8,060,287 B2 | 11/2011 | Headlee et al. | |
| 8,160,781 B2 * | 4/2012 | Naono et al. | 701/48 |
| 8,234,026 B2 * | 7/2012 | Wyatt et al. | 701/22 |
| 2002/0117338 A1 | 8/2002 | Itou | |
| 2004/0011610 A1 * | 1/2004 | Witzler et al. | 188/265 |
| 2005/0029859 A1 * | 2/2005 | Bensch et al. | 303/89 |
| 2008/0086252 A1 | 4/2008 | Nakayama | |
| 2008/0262687 A1 | 10/2008 | Fujita et al. | |

FOREIGN PATENT DOCUMENTS

| | | |
|---|---|---|
| DE | 298 24 319 U1 | 7/2001 |
| DE | 102 08 420 A1 | 9/2002 |
| DE | 102 51 249 A1 | 12/2003 |
| DE | 699 11 903 T2 | 5/2004 |
| DE | 10 2007 047 234 A1 | 4/2008 |
| DE | 10 2008 019 573 A1 | 10/2008 |
| EP | 1 553 289 A1 | 7/2005 |

* cited by examiner

PROCESS FOR CONTROLLING A START-STOP OPERATION OF A VEHICLE HAVING A HYBRID DRIVE, AND A CORRESPONDING VEHICLE

CROSS-REFERENCE TO RELATED APPLICATIONS

This application is a division of application Ser. No. 12/683,749, filed Jan. 7, 2010, which claims priority under 35 U.S.C. §119 to German Patent Application No. DE 10 2009 004 023.4, filed Jan. 8, 2009, the entire disclosures of which are herein expressly incorporated by reference.

BACKGROUND AND SUMMARY OF THE INVENTION

The invention relates to a process for controlling a start-stop operation of a vehicle having a hybrid drive, as well as to a vehicle which can carry out the process.

Vehicles having a hybrid drive, for example, with an internal-combustion engine as a gasoline, gas or diesel engine, and an electric motor as a synchronous motor, are known in various designs, such as parallel hybrids and series hybrids and include service brake systems with an ABS.

A start-stop operation of a vehicle, particularly in city traffic, for example, at traffic lights or in a traffic jam, necessitates a successive starting and decelerating of the vehicle. During stoppage times of the vehicle, the engine, i.e., the internal-combustion engine, is switched off in order to save fuel and to reduce pollutant emissions. When starting, the internal-combustion engine will then be started and the vehicle will be accelerated until the next deceleration. Start-stop systems for motor vehicles are known in which operating conditions of the vehicle and of the operating pedals are determined and are analyzed for switching off and restarting the internal-combustion engine. This applies especially to vehicles in stop-and-go traffic and particularly to supply and delivery driving, such as mail and parcel services using medium-sized vehicles, in which case a parking brake has to be operated when stopping and has to be released when starting. As a result of the frequent torque—load change in the transmission line, whereby the internal-combustion engine is operated outside its ideal characteristic diagram, high wear, high fuel consumption, as well as a constant uncomfortable operation of the parking brake should be considered to be disadvantages.

It is therefore an object of the present invention to create an improved process for controlling a start-stop operation of a vehicle having a hybrid drive, whereby the above-mentioned disadvantages will be eliminated or considerably reduced and additional advantages will be provided. A further object consists of providing a corresponding vehicle.

According to the present invention, a process is provided for controlling a start-stop operation of a vehicle, which has a hybrid drive with an internal-combustion engine and an electric motor, a service brake with an ABS, and an electric parking brake. The process includes the following steps: (S1) determining, monitoring and analyzing performance parameters of the vehicle, of the internal-combustion engine, of the electric motor, of the service brake and of the electric parking brake, the performance parameters featuring the vehicle speed, the rotational wheel speed, the rotational speeds of the internal-combustion engine and of the electric motor, operations and conditions of a service brake pedal, of a parking brake pedal and of an accelerator pedal; (S2) automatically releasing the electric parking brake in the case of a starting prompt because of determined performance parameters; (S3) driving the vehicle by way of the electric motor for the start; (S4) starting the internal-combustion engine by way of the electric motor if the internal-combustion engine is switched off; (S5) driving the vehicle by way of the electric motor and the internal-combustion engine; (S6) activating a generator operation of the electric motor in the case of a braking prompt because of determined performance parameters; (S7) activating the service brake; and (S8) automatically locking the electric parking brake when the vehicle is stopped after a previously definable deceleration time.

A corresponding vehicle having a hybrid drive with an internal-combustion engine and an electric motor has the following: a service brake with an ABS control unit and a service brake pedal; an electric parking brake with a parking brake control and a parking brake lever; at least one clutch for coupling the internal-combustion engine and the electric motor with the wheels of the vehicle; a hybrid drive control unit for controlling the hybrid drive; and a bus for connecting control units, actuators and sensors of the vehicle and the transmission of control signals. The electric parking brake is connected with the hybrid drive control unit for an automatic controllability in previously definable operating conditions of the vehicle.

As a result of the automatic controllability of the electric service brake when controlling the start-stop operation of a vehicle with a simultaneously adapted control and utilization of the electric motor, it becomes possible to advantageously simplify a starting operation and a stopping operation for the driver in that the operating comfort is increased and the driver's attention is not diverted from the traffic when he leaves the vehicle and starts to drive. In this case, fuel consumption is reduced because the electric motor carries out the starting operation and/or assists the internal-combustion engine.

A start or starting prompt when the vehicle is stopped can be determined by the fact that the brake pedal is released or the parking brake was previously locked and the accelerator pedal is operated, which may, for example, be so in the case of a stop at a traffic light. When the vehicle is stopped, after entering the vehicle, the operation of a starting button or an ignition lock while the accelerator pedal is simultaneously operated may represent a starting prompt. Additional combinations are contemplated.

In the case of a driving vehicle, a braking prompt is generated by operating the service brake pedal or by a corresponding signal of a so-called braking assistant.

In the case of a stop or halt operation, another advantage consists of the fact that the electric motor or the hybrid drive is additionally used as a brake in the event of a braking prompt, a transition taking place for using the service brake. In this case, the electric motor, as a generator, can take over a braking function of the vehicle and can simultaneously convert the braking power to electric power for charging a vehicle battery.

As a result of the detection of performance parameters, it becomes possible to determine whether, after a stopping operation, the vehicle continues to be stopped, in which case, the parking brake will then be locked automatically, which, in turn, represents an operating comfort for the driver and offers additional safety because the parking brake may often be forgotten.

The automatic releasing of the electric parking brake and the driving of the vehicle by means of the electric motor can be carried out simultaneously. This can also increase the operating comfort, particularly in the case of vehicles with a manual transmission, because concentrating on releasing the parking brake and simultaneously starting without having the vehicle roll backwards can be eliminated when starting on a slope.

When the internal-combustion engine is switched off while the vehicle is stopped, a starting of the internal-combustion engine can take place after the expiration of a previously definable time period after the process step of driving the vehicle by using the electric motor. When the internal-combustion engine is still in operation, the electric motor can assist the starting operation, in which case the internal-combustion engine is assisted in such a manner that its efficiency is as high as possible and the fuel consumption is low.

When a braking prompt occurs, the generator operation of the electric motor and the service brake can be activated simultaneously. As an alternative, it is also contemplated that the process step of activating the service brake takes place after the expiration of a previously definable time period after the activating of the generator operation of the electric motor.

It is a special advantage that, when a circuit defect of the service brake is determined in the process step of determining, monitoring and analyzing performance parameters and, while the vehicle is driving, a braking prompt is made by means of the service brake pedal and/or the parking brake lever, the process also features the following process steps for an emergency running function, which is also called "secondary braking I": (S1.A1) activating a generator operation of the electric motor; (S1.A2) activating the electric parking brake; and (S1.A3) automatically locking the electric parking brake when the vehicle is stopped after a previously definable deceleration time. Also in the case of a defective service brake pedal, an emergency running function ("secondary braking II") is contemplated, in which case the following process steps take place: (S1.B1) activating operable electric modules of a control unit ABS of the service brake; (S1.B2) activating a generator operation of the electric motor; (S1.B3) activating the electric parking brake; and automatically locking the electric parking brake when the vehicle is stopped after a previously definable delay time.

The operable electric modules may have a reservoir connection for compressed brake control air or compressed brake control operating air, which can be used for an electromechanical controlling of the service brake.

The activation of the generator operation of the electric motor may feature a step-by-step adjusting of the generator operation. Within the range of the stepping capability, a PWM triggering of an actuator system of the parking brake can take place. This actuator system may have a spring-type servo-cylinder (pneumatic or hydraulic in the case of AOH, i.e. air over hydraulic) or may have electromotive or electromechanical application devices.

In one embodiment, the parking brake is adjusted in steps in previously definable ranges during the process step of activating the electric parking brake. It is also contemplated that, by means of the performance parameters determined in the process step of the determining, monitoring and analyzing of performance parameters, a corresponding assist torque of the electric motor is calculated for assisting or implementing the stepped ranges of the parking brake. This calculation can, for example, take place in a hybrid drive control unit or in an electric motor control unit.

In addition, the electric parking brake is constructed such that it has a bistable behavior in the parked condition, whereby, when the electric supply fails, the electric parking brake is locked or released corresponding to a predetermination by the hybrid drive control unit, another assigned control device, or a driver's intention.

In the case of a trailer operation, a braking system of at least one trailer of the vehicle can be synchronously activated in the event of a braking prompt.

The previously definable operating conditions of the vehicle may, for example, be a start-stop operation, an emergency running function in the case of a circuit defect of the service brake and/or an emergency running function in the case of a defective service brake pedal.

In a preferred embodiment, the internal-combustion engine is constructed as a diesel engine.

The electric motor may be arranged in a parallel or serial position with respect to the internal-combustion engine. The performance parameters vehicle speed, wheel speed, status of the service and parking brake, data of the electric motor control unit and of the internal-combustion engine control unit are monitored, determined and analyzed. These data are, for example, available on a bus, such as a CAN bus.

Other objects, advantages and novel features of the present invention will become apparent from the following detailed description of one or more preferred embodiments when considered in conjunction with the accompanying drawings.

DETAILED DESCRIPTION OF THE DRAWINGS

Identical constructional elements or functional units with the same function have the same reference numbers in the figures.

Figure 1:
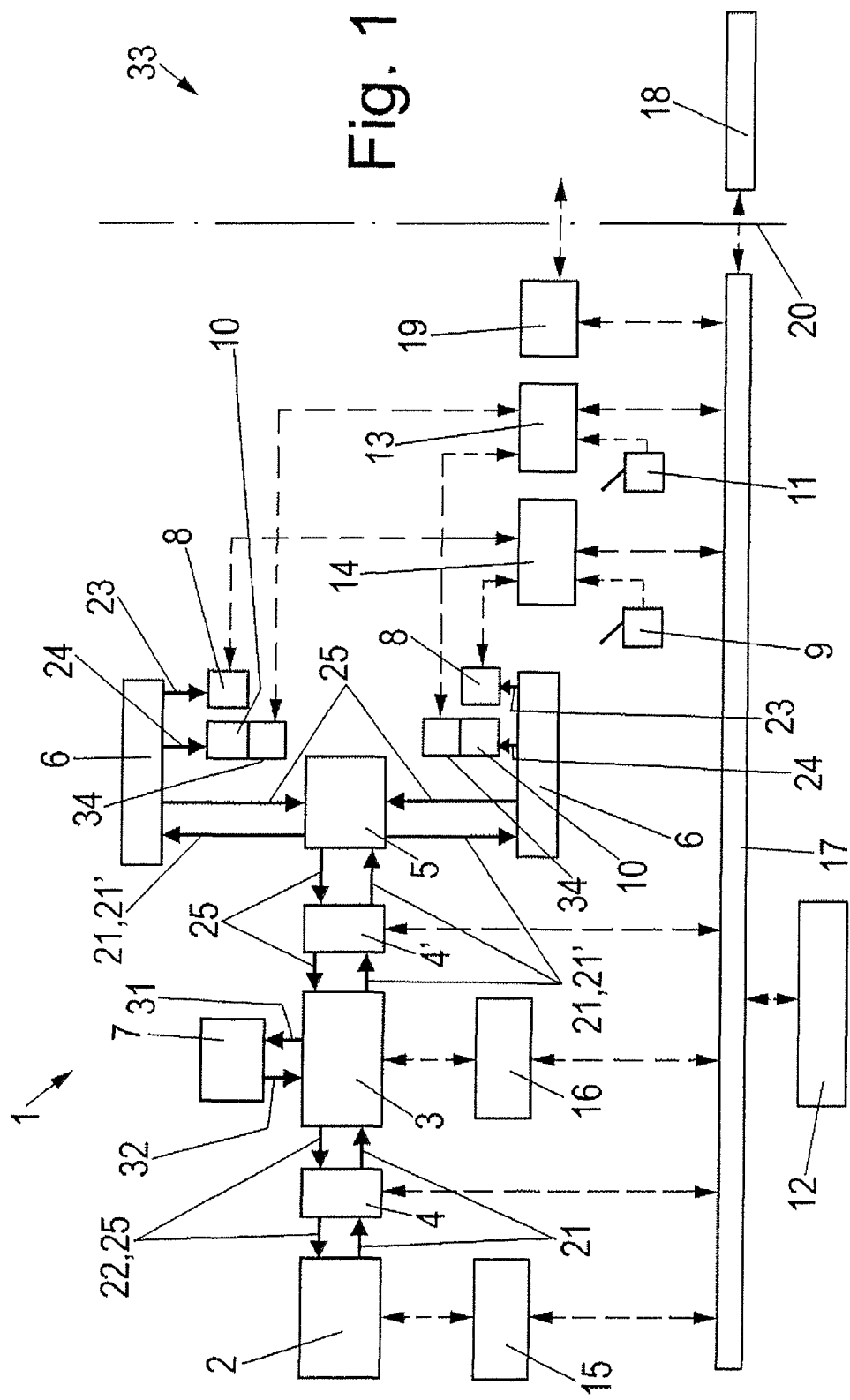
FIG. 1 is a schematic view of an embodiment of a vehicle according to the invention.

FIG. 1 schematically illustrates an embodiment of a vehicle 1 according to the invention. Functional units of the vehicle 1 are shown as blocks in the manner of an energy and signal flow chart. In this case, solid lines with arrows represent energy fluxes and broken lines represent signal flows.

The vehicle 1 has a serial hybrid drive. An internal-combustion engine 2, preferably a diesel engine, is coupled with an electric motor 3 by way of a clutch 4. The electric motor 3 is connected by way of a further clutch 4' with a transmission 5, for example, a transfer transmission, with wheels 6 of the vehicle 1 by way of a transmission line. Furthermore, the electric motor 3 is coupled with a battery 7 as a power source. The battery 7 may, for example, be a high capacity battery and/or a fuel cell. The wheels 6 are equipped with a service brake 8 and a parking brake 10.

Between the internal-combustion engine 2, the clutch 4 and the electric motor 3, an energy flux is illustrated in solid lines as a driving torque 21, which is generated by the internal-combustion engine and is further transmitted by way of the clutch 4' and the transmission 5 to the wheels 6. A driving torque 21' of the electric motor 3 is guided by way of the clutch 4' to the transmission line by way of the transmission 5 to the wheels 6. The battery 7 supplies a driving current 32 for the electric motor 3. By way of the clutch 4, the electric motor 2 can furthermore admit a starting torque 22 to the internal-combustion engine 2 in order to start the latter.

During a braking operation, the service brake 8 absorbs a service braking torque 23 and the parking brake 10 absorbs a parking brake torque 24. By way of the transmission line, the rotating wheels 6 in the coasting operation transmit a generator torque 25 to the electric motor 3 which, in this case, operates as a generator and converts the generator torque 25 to electric power, by which, for example, the battery 7 is charged by a charging current 31. The generator torque 25 can also be transmitted to the internal-combustion engine 2 when the clutch 4 is engaged. Then, the internal-combustion 2 will act as an engine brake, or its possible engine brake units (not shown) connected with the internal-combustion engine 2 can be acted upon in this manner by the generator torque 25 in order to additionally indirectly brake the wheels 6.

The internal-combustion engine 2 is connected with an internal-combustion engine control unit 15 by way of a signal line. This control unit 15 is established for known control purposes of an internal-combustion engine and will not be further discussed in detail. An electric motor control unit 16 is connected with the electric motor 3 and controls the latter as an electric motor and as a generator for charging the battery 7. In this example, the electric motor control unit 16 is simultaneously also responsible for monitoring the battery.

The service brake 8 is linked with an ABS control unit 14 having an ABS function, which will also not be explained in detail, and with a service brake pedal 9 for the braking prompt. The electric parking brake 10 has an actuator 34 which can be applied, for example, as a spring-type servo-cylinder (pneumatically or hydraulically in the case of AOH) or electromotively or electromechanically. The parking brake 10 is controlled by a parking brake control 13 which is coupled with a parking brake lever 11 for the manual operation. In this case, the parking brake 10 can be controlled in previously adjustable steps. Within the range of this stepping capability, the actuator 34, for example, a motor or cylinder, can be triggered by means of a pulse width modulation (PWM). Furthermore, the actuator 34 has a bistable course of action. This means that its effect on the brake lining of the service brake is such that, when the electric power source is switched off, the brake remains in an applied or released position, as previously defined by the system, i.e. by the parking brake control 13 or a higher-ranking control (see below) or a driver's intention.

These control units 15, 16, 13 and 14 as well as controls (not shown in detail) of the clutches 4, 4', which, for example, are electromagnetically controllable clutches, and a trailer control valve 19 are connected with a bus 17, such as a CAN bus, to which a hybrid drive control unit 12 is connected. The bus 17 is connected with a trailer bus 18 by way of a trailer interface 20.

In this example, the hybrid drive control unit 12 has software for controlling the hybrid drive including a higher-ranking control of the brakes. It thereby becomes possible to advantageously achieve a linking of the hybrid drive with an automatic release and locking of the parking brake 10 for certain operating conditions of the vehicle. It thereby becomes possible to control a start-stop operation SSB, which, as illustrated by FIG. 2 in a schematic graphic representation of an ideal minimal consumption MW, is situated in an area outside the ideal characteristic diagram of the hybrid drive, such that the electric motor 3 assists the internal-combustion engine 2, preferably a diesel engine, so that the latter operates with an ideal efficiency.

Figure 2:
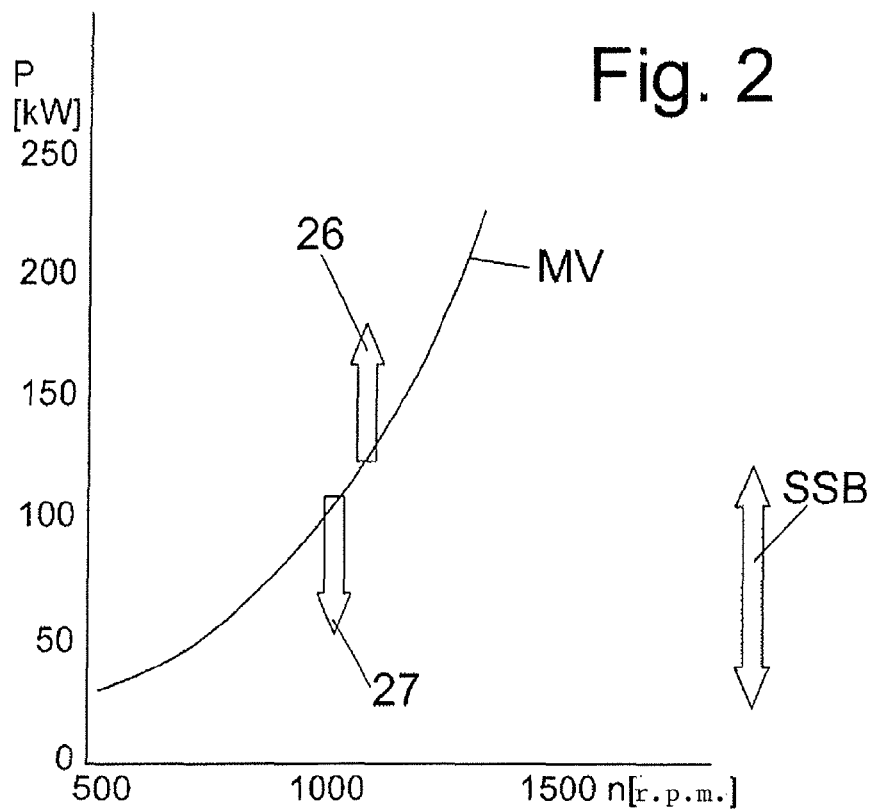
FIG. 2 is a schematic graphic representation of an ideal minimal consumption.

In FIG. 2, a torque is entered above a rotational speed, an arrow indicating a boosting performance 26 that is required for increasing the torque, for example, by the internal-combustion engine 2 or additionally by the electric motor 3. Furthermore, a storage capacity 27 is indicated by a downward-pointing arrow, which, during a braking operation, can be converted by the electric motor 3 from a torque to an electric current, which then results in a storage of electric power in the battery 7. Status values of the internal-combustion engine control unit 15 are determined together with the vehicle speed as performance parameters of the vehicle 1 and are analyzed, for example, also evaluated with respect to time. Simultaneously, data from a central onboard computer (ZBR) or a vehicle controlling computer (FFR), such as braking activities of the service brake pedal 9, are present on the bus 17. From these performance parameters, an assist torque, for example, is computed by the hybrid drive control unit 12 for the electric motor 3 in order to assist the internal-combustion engine 2 with respect to its ideal efficiency.

Performance parameters of the vehicle, of the internal-combustion engine, of the electric motor, of the service brake, and of the electric parking brake are, for example, the following: vehicle speed, wheel speed, rotational speeds of the internal-combustion engine and of the electric motor, operations and conditions of a service brake pedal, of a parking brake lever and of an accelerator pedal. These can be retrieved from corresponding sensors or pertaining controls or a central computer and/or bus system.

As illustrated in FIG. 1, the hybrid drive is capable of uncoupling the internal-combustion engine 2 from the transmission line by means of the clutches 4, 4' and to carry out the driving torque 21' for the wheels 6 by the electric motor 2. In the start-stop range or start-stop operation, by way of the hybrid drive control unit 12, the start-stop function is linked with the electric parking brake 10. This means, in other words: by operating the service brake pedal 9, the electric motor 3 is switched by its control unit 16 to the generator operation, in which case the generator torque 25 generated by the wheels 6 in the coasting operation drives the electric motor 3. This takes place before the service brake 8 is applied or simultaneously therewith. The kinetic energy, which is still driving the vehicle 1 in the coasting operation, is thereby not simply only converted to heat but is converted by the electric motor 3 in the generator operation to electric energy, which is stored in the battery 7 and will be available again as a driving torque 21' for further driving of the electric motor 3. As soon as the vehicle 1 is stationary or is stationary for a previously definable period of time, the parking brake 10, controlled by way of the hybrid drive control unit 12, the bus 17 and the parking brake control 13, is automatically locked.

In the case of a starting prompt, for example, at a traffic light in front of which the vehicle 1 is stopped, the locked parking brake 10 is automatically released and the vehicle 1 is started by the electric motor 3. For this purpose, the accelerator pedal and the service brake pedal 9 are monitored and their conditions are evaluated. For example, when the service brake pedal 9 is released and the accelerator pedal is operated, the starting operation will take place. By way of the trailer brake valve 19, a trailer brake is simultaneously opened. The electric motor 3 assists the starting by its driving torque 21' in addition to the driving torque 21 of the internal-combustion engine 2. If the latter has been switched off, the electric motor 3, by means of engaging the clutch 4, can start the internal-combustion engine 2 immediately or after the expiration of a previously definable time period.

Figure 3:
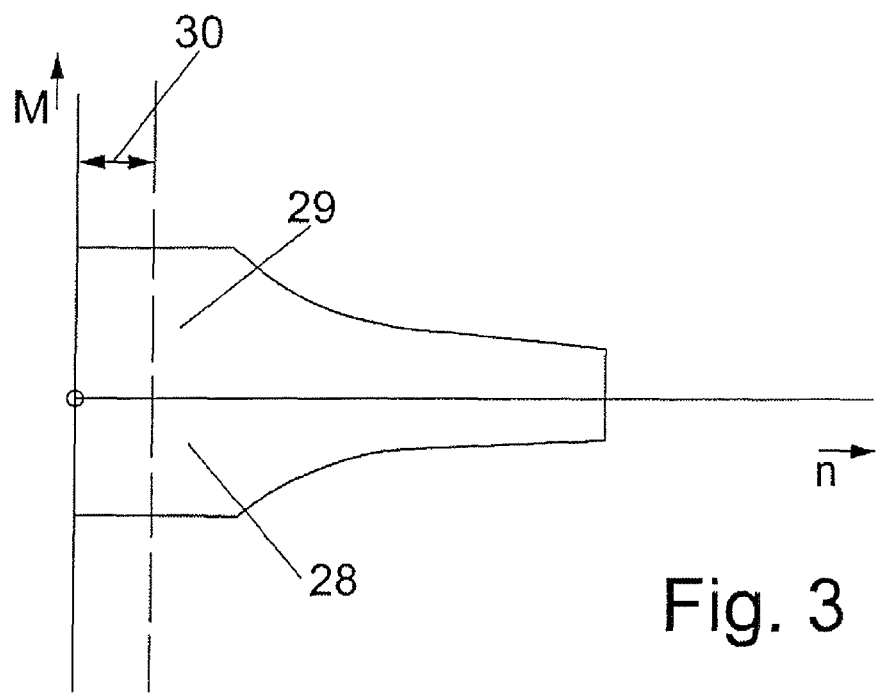
FIG. 3 is a schematic graphic representation of a start-stop operation.

FIG. 3 is a simplified schematic graphic view of a start-stop operation with a use range 30. A torque M is entered above a rotational speed n of the hybrid drive. Above the abscissa, a driving operation is situated; below the abscissa, a charging operation is situated, similar to the one shown in FIG. 2. The use range 30 of the start-stop operation is situated in the range of the starting rotational speeds starting at 0. In this use range 30, it is possible to advantageously utilize the synergies of the automatically controlled parking brake 10 in connection with the hybrid drive, in order to lower the fuel consumption, increase the driving comfort and the safety and lower the wear.

Figure 4:
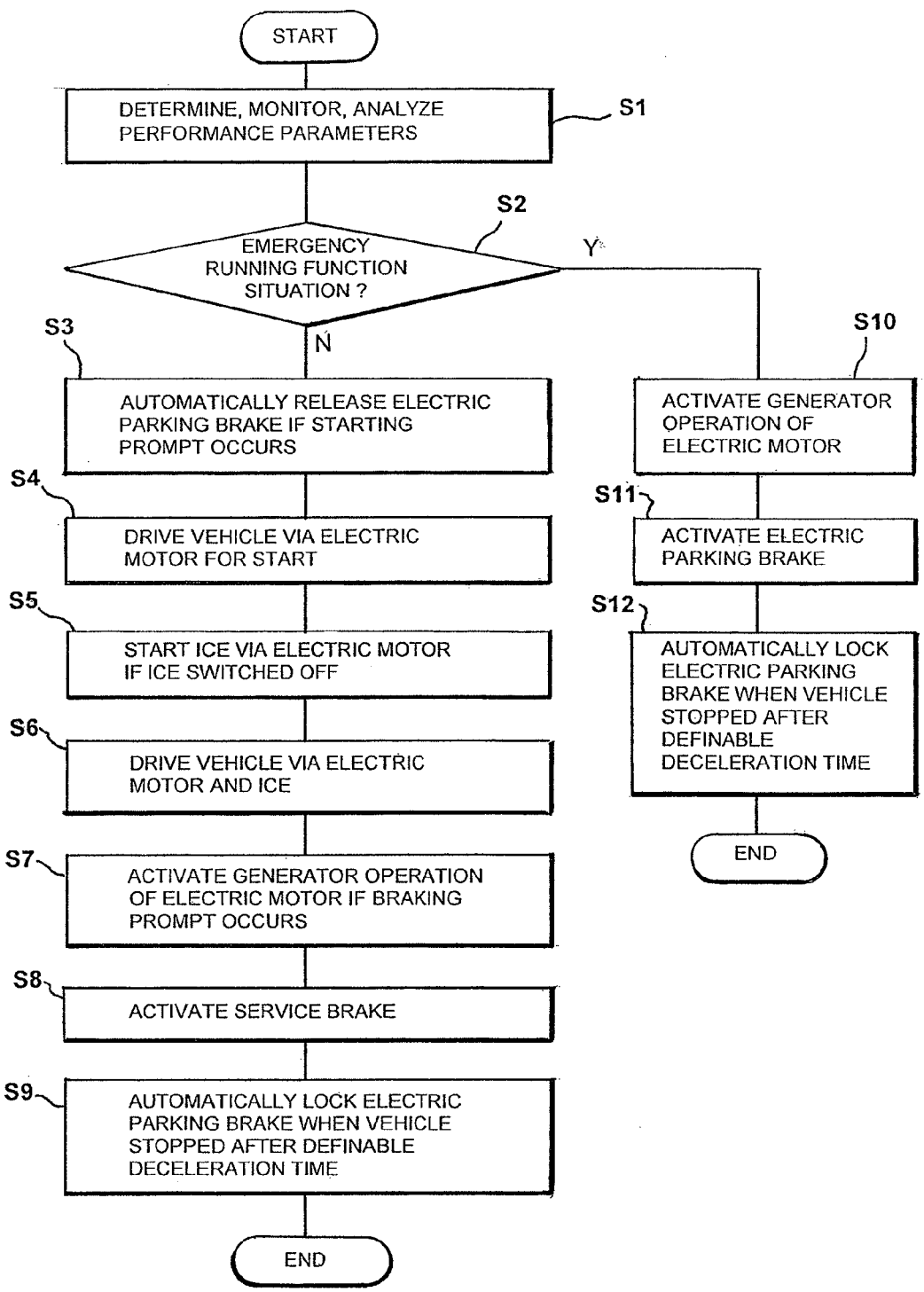
FIG. 4 is a flowchart illustrating an exemplary process for controlling a start-stop operation of a vehicle according to the invention.

Referring to FIG. 4, an exemplary process is disclosed by the illustrated flow chart. After starting, the process determines, monitors and analyzes performance parameters of the vehicle, of the internal-combustion engine, of the electric motor, of the service brake and of the electric parking brake (S1). The performance parameters feature the vehicle speed, the rotational wheel speed, the rotational speeds of the internal-combustion engine and of the electric motor, operations and conditions of a service brake pedal, of a parking brake pedal and of an accelerator pedal. Based on step S1, it is possible that an emergency running function situation occurs (S2). Under normal operation, the process automatically releases the electric parking brake in the case of a starting prompt because of determined performance parameters (S3). The process then drives the vehicle via the electric motor for the start (S4). The process starts the internal-combustion engine by way of the electric motor if the internal-combustion engine is switched off (S5). The process drives the vehicle by way of the electric motor and the internal-combustion engine (S6). The process activates a generator operation of the electric motor in the case of a braking prompt because of determined performance parameters (S7). The process activates the service brake (S8). The process automatically locks the electric parking brake when the vehicle is stopped after a previously definable deceleration time (S9) before ending.

FIG. 4 illustrates a first emergency running function situation when a circuit defect of the service brake is determined and, when the vehicle is driving, a braking prompt takes place via the service brake pedal and/or the parking brake lever. In that emergency running situation, the process activates a generator operation of the electric motor (S10). The process activates the electric parking brake (S11). The process automatically locks the electric parking brake when the vehicle is stopped after a previously definable deceleration time (S12).

In addition, emergency running functions, such as a so-called "secondary braking I and II", are contemplated. In the case of defects of a brake circuit or of a service brake pedal 9, an assist by the parking brake 10 is prompted. This can take place, for example, automatically or manually (after informing the driver, for example, by way of a display) by way of the parking brake lever 11. Then a stepped range of the electric motor 3 in the generator operation is switched on by its control unit 16, in order to assist the braking. The parking brake 10 can also be used in a stepped manner controlled by its control unit 13, so that the vehicle 1, for example, in the event of a circuit defect determined by monitoring the performance parameters, can nevertheless be braked.

When the vehicle 1 is stationary, as described above, an automatic locking of the parking brake 10 takes place. A defective service brake pedal 9 can also be determined by monitoring the performance parameters. In this case, for example, intact units of the control unit ABS 14 are activated, which have a compressed-air storage tank connection, and can electromechanically control the compressed air for the braking. A braking prompt can also take place in the driving condition by way of the parking brake lever 11, in which case the parking brake 10 is applied in a stepped manner as described. A simultaneous activating of the electric motor 3 in the generator operation also takes place in this case. This generator operation can also be controlled in a stepped manner. For this purpose, the performance parameters are also determined and analyzed in order to correspondingly calculate and control assist torques. When assisting this "secondary braking", for example, the trailer braking valve 19 is electrically or pneumatically excited to synchronously brake the trailer 33 by way of the still intact third brake circuit. Parallel thereto, by way of the bus 17, 18, an electric deceleration request signal is transmitted to a trailer brake control unit (not shown), so that the latter will pneumatically brake the trailer in a synchronous manner.

It is, for example, further contemplated that, during a braking operation in the start-stop mode, engine braking functions of the internal-combustion engine 2 are also utilized in that the generator torque 25 is transmitted to the internal-combustion engine 2 by the clutch 4, which internal-combustion engine 2 is controlled by the internal-combustion control unit 15 into a corresponding engine braking operation condition.

Braking prompts can also be carried out by so-called assist systems, such as a braking assist or a cruise control.

The computing operations, pertaining tables and algorithms may already be present and utilized in the software—the existing control units and/or in the central computer. It is naturally also conceivable that an additional control unit for the start-stop operation and the emergency running functions is used separately.

TABLE OF REFERENCE SYMBOLS

1 Vehicle
2 Internal-combustion engine
3 Electric motor/generator
4,4' Clutch
5 Transmission
6 Wheel
7 Battery
8 Service brake
9 Service brake pedal
10 Parking brake
11 Parking brake lever
12 Hybrid drive control unit
13 Parking brake control
14 ABS control unit
15 Internal-combustion engine control unit
16 Electric motor control unit
17 Bus
18 Trailer bus
19 Trailer brake valve
20 Trailer interface
21,21' Driving torque
22 Starting torque
23 Service brake torque
24 Parking brake torque
25 Generator torque
26 Boosting performance
27 Storage capacity
28 Charging operation
29 Driving operation
30 Use range
31 Charging current
32 Driving current
33 Trailer
34 Actuator
MV Minimal consumption
SSB Start-stop range The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
a hybrid drive having an internal-combustion engine and an electric motor;
a service brake with an ABS control unit and a service brake pedal;
an electric parking brake with a parking brake control and a parking brake lever;
at least one clutch for coupling the internal-combustion engine and the electric motor with wheels of the vehicle;
a hybrid drive control unit for controlling the hybrid drive; and
a bus for connecting control units, actuators and sensors of the vehicle and for transmission of control signals;
wherein the electric parking brake is connected with the hybrid drive control unit for an automatic controllability in previously definable operating conditions of the vehicle, and
wherein the hybrid drive control unit is configured to:
control a start-stop operation of the hybrid drive coordinated with an automatic release of the electric parking brake in the case of a starting prompt because of determined performance parameters and an automatic locking when the vehicle is stopped after a previously definable deceleration time;
control activation and locking of the electric parking brake in an emergency running function when at least one of a circuit defect of the service brake and a defective service brake pedal is determined when the vehicle is driving and a braking prompt takes place by at least one of the service brake pedal and the parking brake lever, the process of the emergency running function further comprising the acts of:
activating a generator operation of the electric motor;
activating the electric parking brake; and
automatically locking the electric parking brake when the vehicle is stopped after a previously definable deceleration time;
wherein the electric parking brake has a stepping capability with previously definable steps.

2. The vehicle according to claim 1, wherein the electric parking brake is equipped with an actuator constructed as at least one of a spring-type servo-cylinder, electromotive actuator, and electromechanical actuator.

3. The vehicle according to claim 1, wherein a pulse width modulation of a triggering of the electric parking brake is provided in the range of the stepping capability.

4. The vehicle according to claim 1, wherein the electric parking brake has a bistable behavior in a parked condition, whereby, when an electric supply fails, the electric parking brake is locked or released corresponding to a predetermination by the hybrid drive control unit or a driver's intention.

5. The vehicle according to claim 1, wherein the previously definable operating conditions of the vehicle are at least one of the start-stop operation, an emergency running function in an event of a circuit defect of the service brake, and an emergency running function in an event of a defective service brake pedal.

6. The vehicle according to claim 1, wherein the internal-combustion engine is a diesel engine.

* * * * *